US010836332B2

(12) United States Patent
Yamamoto et al.

(10) Patent No.: US 10,836,332 B2
(45) Date of Patent: Nov. 17, 2020

(54) CONNECTION STRUCTURE CONNECTING CONDUIT TO PROTECTOR, AND WIRE HARNESS

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventors: Satoshi Yamamoto, Mie (JP); Kazuyoshi Ohara, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/631,514

(22) PCT Filed: Jul. 10, 2018

(86) PCT No.: PCT/JP2018/025969
§ 371 (c)(1),
(2) Date: Jan. 16, 2020

(87) PCT Pub. No.: WO2019/017238
PCT Pub. Date: Jan. 24, 2019

(65) Prior Publication Data
US 2020/0207290 A1      Jul. 2, 2020

(30) Foreign Application Priority Data

Jul. 21, 2017   (JP) .................................. 2017-141787

(51) Int. Cl.
*B60R 16/02*     (2006.01)
*B60N 2/06*      (2006.01)
(Continued)

(52) U.S. Cl.
CPC ............ *B60R 16/0215* (2013.01); *B60N 2/06* (2013.01); *H01B 7/0045* (2013.01);
(Continued)

(58) Field of Classification Search
CPC ....... B60R 16/0215; B60N 2/06; H02G 11/00
(Continued)

(56) References Cited

U.S. PATENT DOCUMENTS 6,492,592 B1 *   12/2002   Murofushi ................. B60J 5/06
                                                           174/70 R
2002/0005014 A1 *  1/2002   Doshita ................. B60R 16/027
                                                           49/360
(Continued)

FOREIGN PATENT DOCUMENTS

JP          4085081 B       4/2008
JP       2011-025746 A       2/2011
JP       2014-212664 A      11/2014

OTHER PUBLICATIONS

International Search Report dated Sep. 25, 2018 for WO 2019/017238 A1.

*Primary Examiner* — Sherman Ng
(74) *Attorney, Agent, or Firm* — Abelman, Frayne & Schwab

(57) ABSTRACT

A connection structure connecting a conduit 12 to a protector 30, the conduit 12 having a wire 11 inserted therein and being configured to move in accordance with sliding of a sliding object, and the protector 30 being attached to an end portion of the conduit 12 and being configured to move with the conduit 12, wherein, the protector 30 includes: a latch portion 39 that is joined to the conduit 12 in a latched state; and a sliding portion 15 that can slide in the direction in
(Continued)

which the conduit 12 extends, opposes the conduit 12 in a normal position, and restricts release of the latched state of the latch portion 39.

4 Claims, 20 Drawing Sheets

(51) Int. Cl.
    *H01B 7/00*          (2006.01)
    *H02G 3/04*          (2006.01)
    *H02G 3/30*          (2006.01)
    *H02G 11/00*        (2006.01)

(52) U.S. Cl.
    CPC ......... *H02G 3/0418* (2013.01); *H02G 3/0437* (2013.01); *H02G 3/30* (2013.01); *H02G 11/00* (2013.01)

(58) Field of Classification Search
    USPC ........................................................ 174/72 A
    See application file for complete search history.

(56) References Cited

U.S. PATENT DOCUMENTS

| | | | | |
|---|---|---|---|---|
| 2009/0200062 A1* | 8/2009 | Aoki | ...................... | H02G 11/00 |
| | | | | 174/136 |
| 2010/0147586 A1* | 6/2010 | Pieh | ...................... | E05F 15/655 |
| | | | | 174/99 R |
| 2016/0280157 A1* | 9/2016 | Katou | ................... | H02G 3/0462 |
| 2018/0361960 A1 | 12/2018 | Yamamoto et al. | | |

* cited by examiner

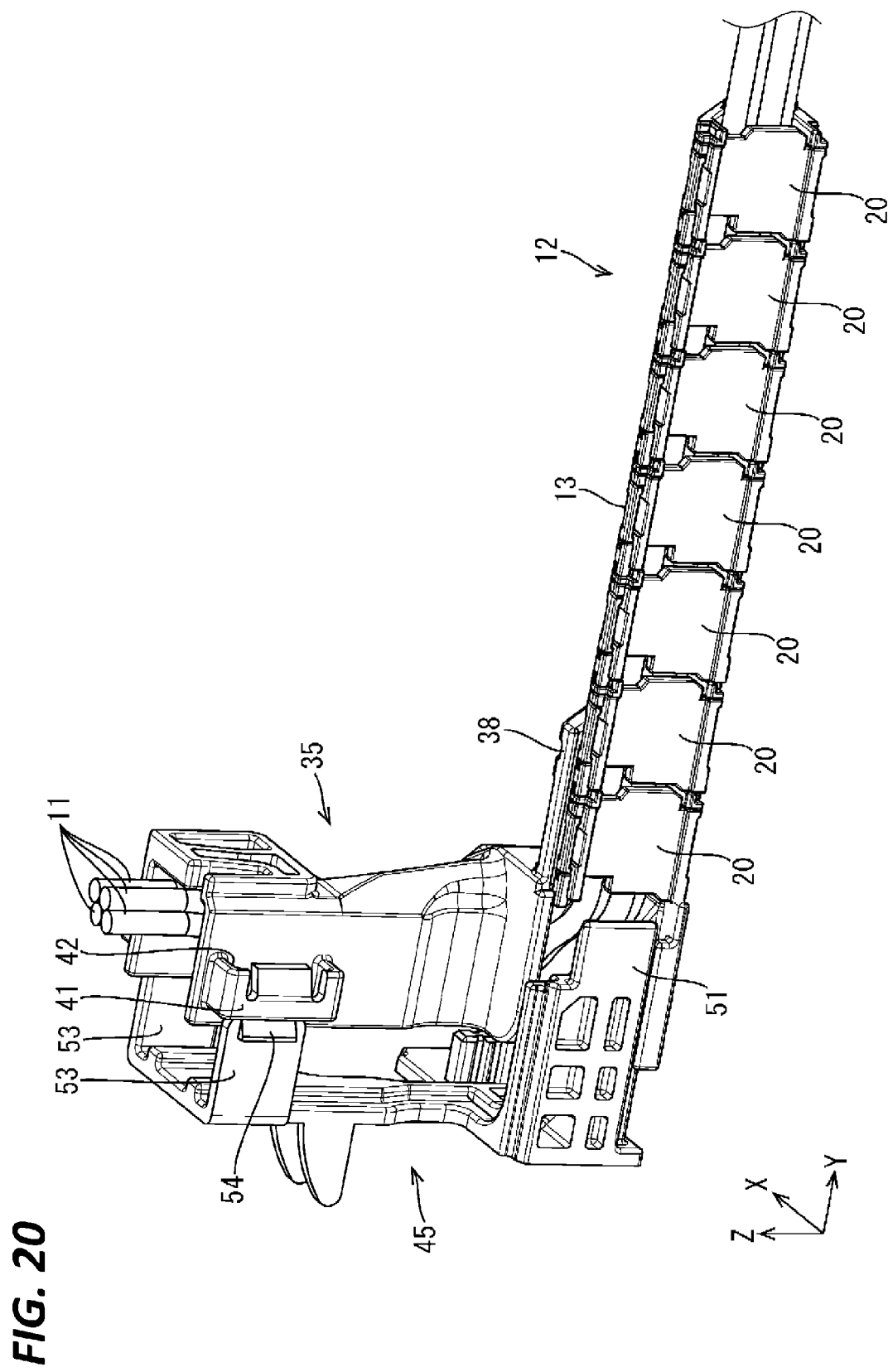

CONNECTION STRUCTURE CONNECTING CONDUIT TO PROTECTOR, AND WIRE HARNESS

CROSS REFERENCE TO RELATED APPLICATIONS

This application is a national phase of PCT application No. PCT/JP2018/025969, filed on 10 Jul. 2018, which claims priority from Japanese patent application No. 2017-141787, filed on 21 Jul. 2017, all of which are incorporated herein by reference.

TECHNICAL FIELD

The present specification discloses a technique related to a wire harness.

BACKGROUND

Conventional automobiles are provided with slidable seats, and the seats are installed with electric components such as electric reclining apparatuses and seat heaters. Wire harnesses, which connect these electronic components to devices and the like on the vehicle body side, have tubular exterior bodies into which wires are inserted, and are configured to move with the sliding of the seats. In Patent Document 1 listed below, the wires are inserted into a corrugated tube, and an end of the corrugated tube is connected to a protector. The protector is fixed to an end portion of the corrugated tube from above and below by sandwiching the end of the corrugated tube with a protector body and a lid, and the direction of the wire inserted into the corrugated tube changes in the protector and the wire is led towards the seat.

PRIOR ART DOCUMENT

Patent Document

Patent Document 1: JP 4085081B

SUMMARY OF THE INVENTION

Problems to be Solved

A problem with the protector in Patent Document 1 is that the protector is fixed to an end portion of the corrugated tube from above and below by sandwiching the end portion of the corrugated tube with the protector body and the lid, and therefore a reliable connection to the protector is not possible if the protector does not have a bellows-shape such as that of the corrugated tube.

The technique described in the present specification has been completed based on circumstances such as those described above, and an object thereof is to provide a connection structure connecting a conduit to a protector, and a wire harness, with which the conduit and the protector can be connected to each other.

Means to Solve the Problem

A connection structure connecting a conduit to a protector according to the present specification, the conduit having a wire inserted therein and being configured to move in accordance with sliding of a sliding object, and the protector being attached to an end portion of the conduit and being configured to move with the conduit, wherein the protector includes: a latch portion that is joined to the conduit in a latched state; and a sliding portion that can slide in the direction in which the conduit extends, opposes the conduit in a normal position, and restricts release of the latched state of the latch portion.

A wire harness according to the present specification, including: a wire that is configured to move in accordance with sliding of a sliding object; a conduit that has the wire inserted therein and is configured to move with the wire; and a protector that is attached to an end portion of the conduit, moves with the conduit and has the wire inserted therein, wherein the protector includes: a latch portion that is joined to the conduit in a latched state; and a sliding portion that can slide in the direction in which the conduit extends, opposes the conduit in a normal position, and restricts release of the latched state.

With the configuration, the sliding portion is slid in the direction in which the conduit extends and moves to a normal position, and it is therefore possible for the protector to connect to an end portion of the conduit even if the conduit is not bellows-shaped. Also, it is possible to join the protector to the conduit in a locked state and slide the sliding portion, thus improving workability of attachment.

The following mode is preferable as an embodiment of the technique disclosed in the present specification.

A first protector that includes the latch portion and a locked portion and a second protector that includes the sliding portion and a locking portion that is configured to move in the direction in which the sliding portion slides and locks to the locked portion, wherein the wire is inserted between the first protector and the second protector.

With this configuration, the second protector slides into the first protector in the direction in which the conduit extends, and therefore it is possible to both move the sliding portion to the normal position and lock the locking portion to the locked portion, thus making it possible to improve the workability of attachment.

The conduit has a polygonal tube shape and includes a flat outer surface, and the sliding portion has a flat plank-shape and opposes the flat outer surface of the conduit.

With this configuration, it is possible to face the sliding portion toward the outer surface of the conduit with a simple configuration.

The protector is fixed to a slider that is slidably arranged in a rail that is fixed to a vehicle.

Effect of the Invention

With the technique described in the present specification, it is possible to connect the conduit and the protector.

BRIEF DESCRIPTION OF THE DRAWINGS

FIG. 20 is a perspective view showing the process of attaching the second protector to the first protector, shown from a different direction than in FIG. 19.

DETAILED DESCRIPTION TO EXECUTE THE INVENTION

First Embodiment

A first embodiment will be described with reference to FIGS. 1 to 20.

Figure 1:
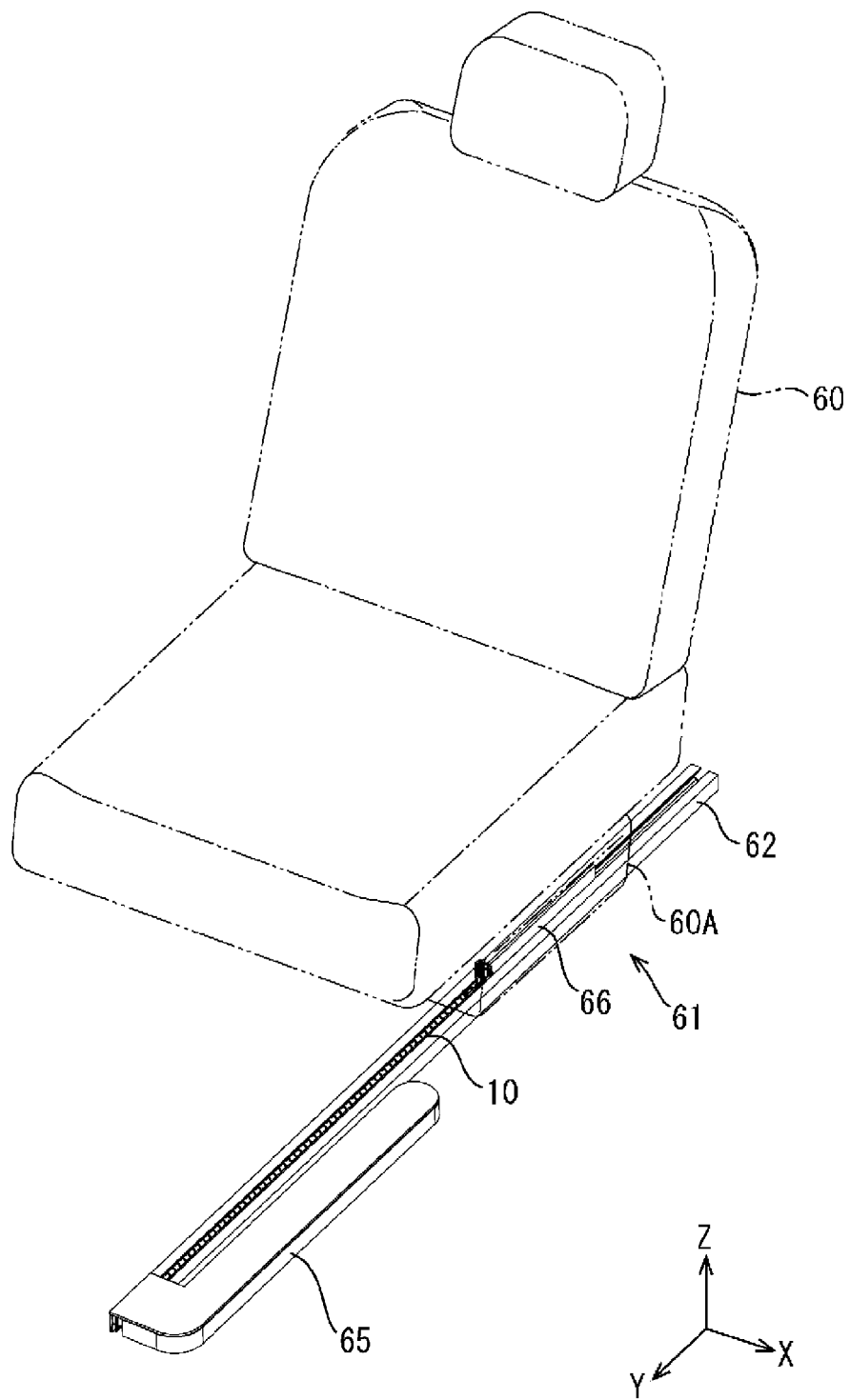
FIG. 1 is a perspective view showing a state in which a wire harness of an embodiment is routed under a seat.

As shown in FIG. 1, a wire harness 10 of the present embodiment is routed under a seat 60 (which is an example of a "sliding object") of a vehicle such as an automobile, and moves in accordance with the sliding of the seat 60. One end of the wire harness 10 is connected to an electrical component of the seat 60, and the other end of the wire harness 10 passes over the floor (and under a mat or a panel for example) or under the floor of the vehicle and is connected to another device such as an ECU (Electronic Control Unit) in the vehicle body. The following description will be given with reference to the directions shown in FIG. 1, where the X direction is rightward, the Y direction is forward, and the Z direction is upward.

The seat 60 may include various electrical components such as, for example, an electric reclining apparatus, a seat heater, a sensor that detects whether or not a passenger is sitting on the seat, or a sensor that detects whether or not a passenger has fastened their seatbelt. A lower portion of the seat 60 includes an attaching portion 60A that is attached and fixed to a slide apparatus 61 that enables the seat 60 to slide.

Figure 2:
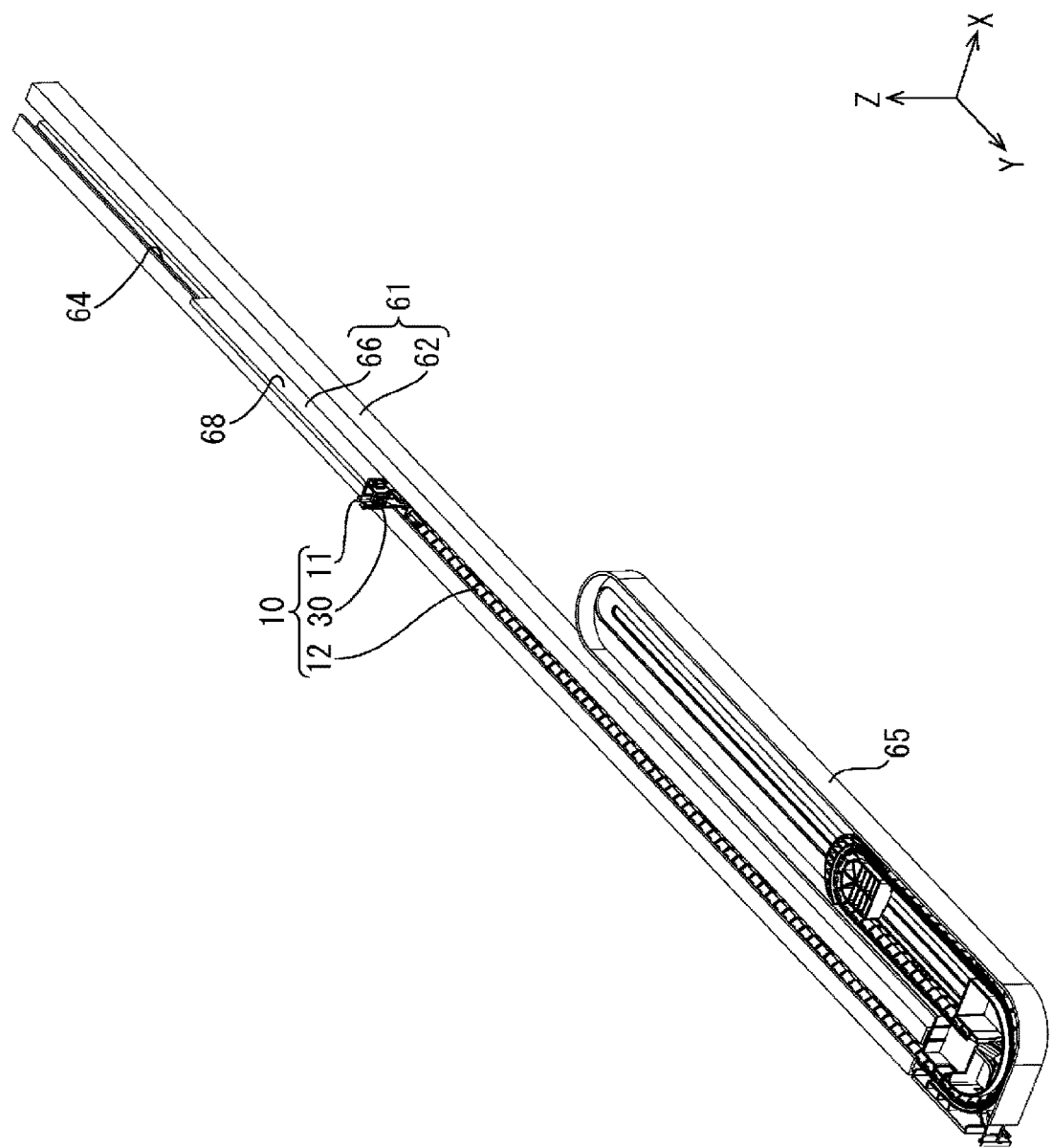
FIG. 2 is a perspective view showing a state in which the wire harness can slide with use of a slide apparatus.

As shown in FIG. 2, the slide apparatus 61 includes a rail 62, and a slider 66 that is slidably inserted into the rail 62. The rail 62 is made of a metal, extends in a straight line in the front-rear direction, and has an insertion hole formed running therethrough in the front-rear direction into which the body (not shown) of the slider 66 is inserted. Each seat 60 is provided with a pair of rails 62 that are fixed to the upper surface of the floor of the passenger compartment of the vehicle by bolt-fastening or the like. The upper sides of the insertion holes of the rails 62 have through-grooves 64 that are in communication with the outside and extend in a straight line in the front-rear direction. An excess length absorption member 65 is mounted at a position adjacent to the front and the side of the rail 62. Excessive length of the wire harness 10 that is not accommodated in the rail 62 is accommodated in the excess length absorption member 65, as the seat 60 slides in the forward direction.

The slider 66 may be, for example, made of a synthetic resin or made of a metal, and has an attachment portion 68 that protrudes upright in a plank-shape from the upper surface of the rectangular parallelepiped body of the slider 66 that is fitted into the insertion hole of the rail 62. The attachment portion 68 slides in a slit that is formed in a mat or the like on the floor, and moves the slider 66 in the rail 62 in accordance with the sliding of the seat 60 because the attaching portion 60A is attached and fixed to the attachment portion 68 with a bolt or the like.

(Wire Harness 10)

Figure 3:
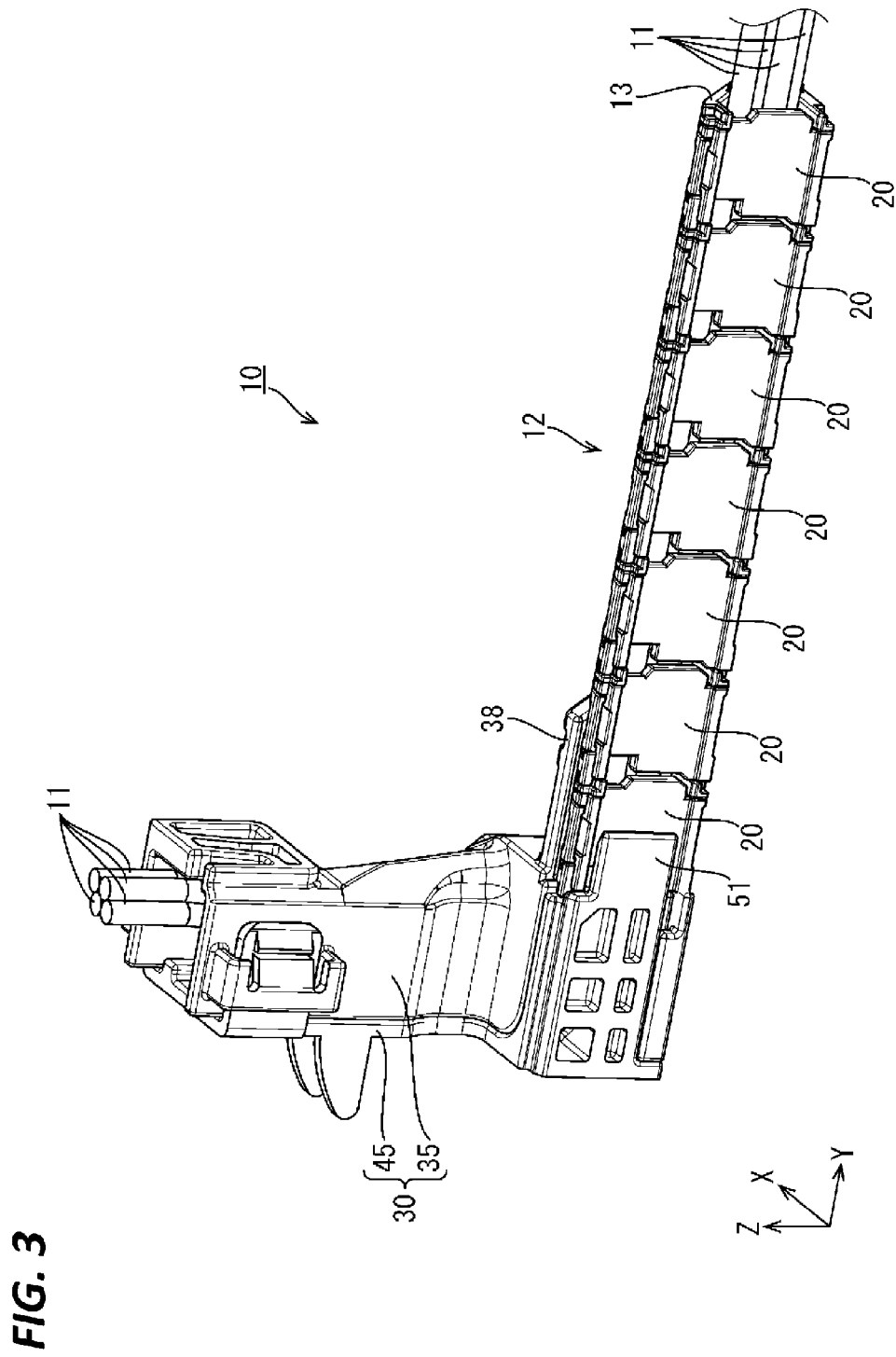
FIG. 3 is a perspective view showing the wire harness.
Figure 4:
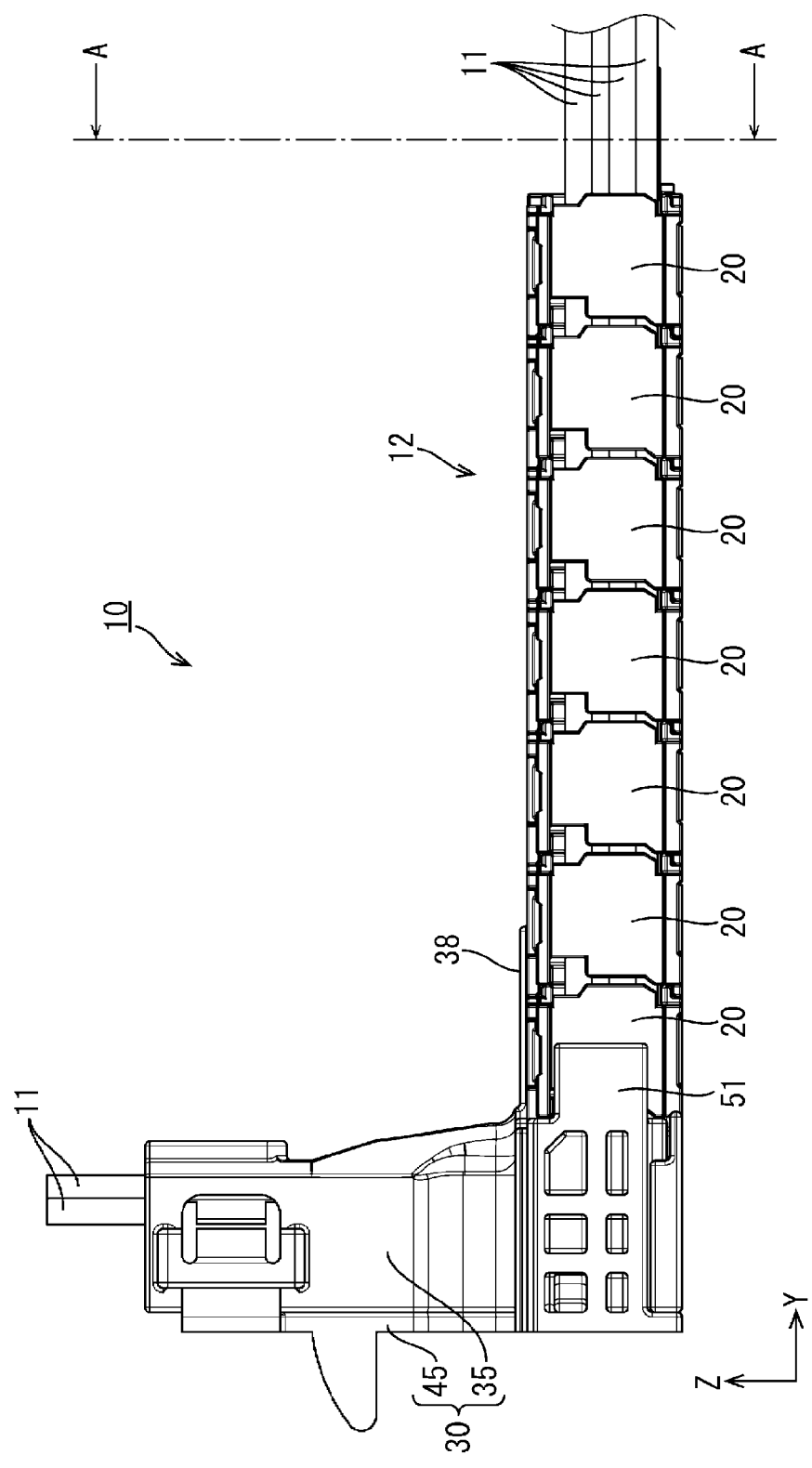
FIG. 4 is a side view showing the wire harness.
Figure 5:
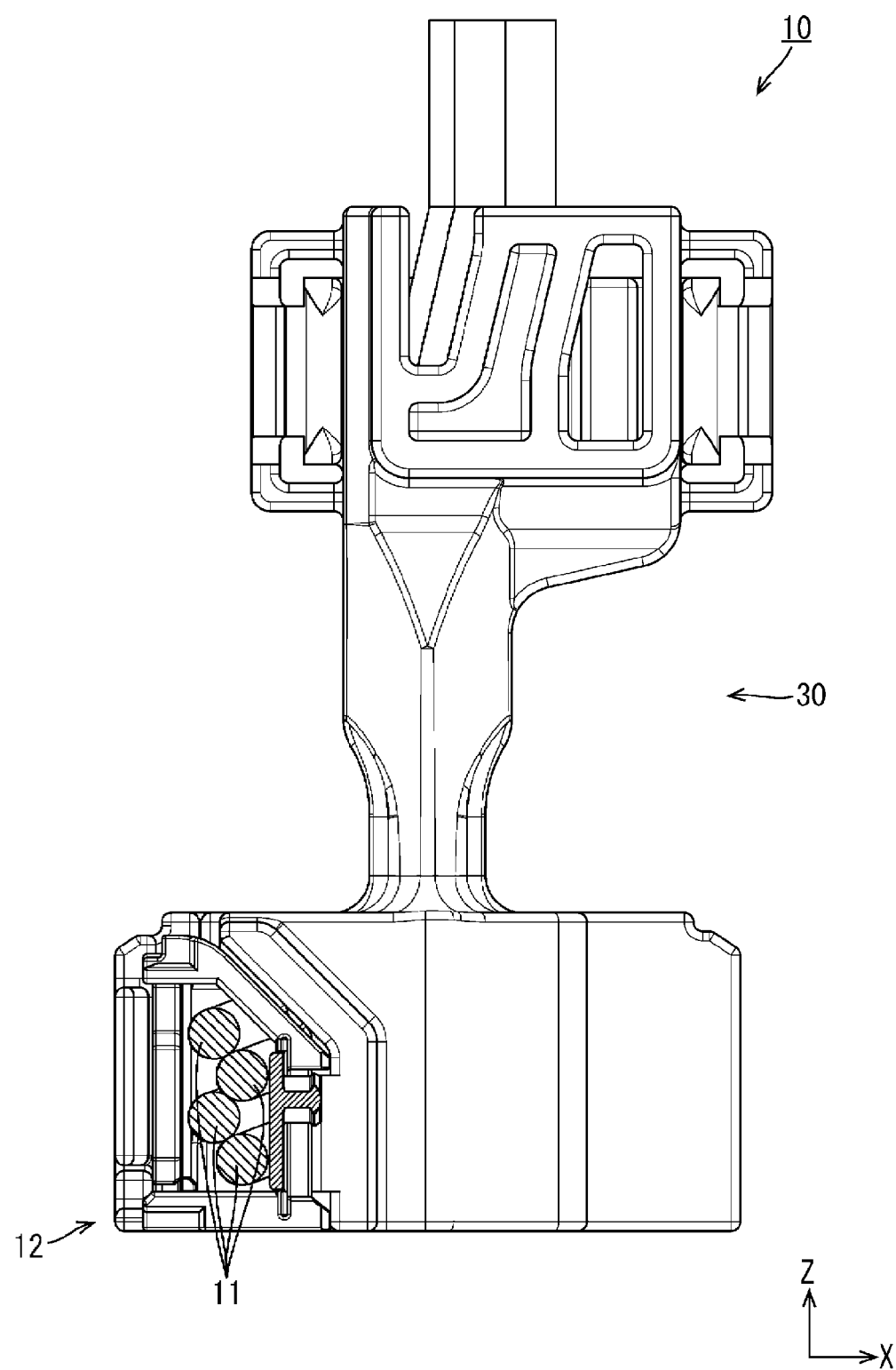
FIG. 5 is a cross-sectional view taken along line A-A in FIG. 4.

As shown in FIG. 3, the wire harness 10 includes a plurality (four in the present embodiment) of wires 11, a conduit 12 into which the plurality of wires 11 are inserted, and a protector 30 into which the plurality of wires 11 are inserted that changes the direction of the wires 11 led out from the conduit 12 and leads the wires 11 towards the seat 60.

(Wires 11)

The wires 11 are covered wires made by covering metal conductors with an insulating layer, and are connected to various types of electrical components that are provided in the seats 60. Note that the wires 11 that are routed on the outer side of the rail 62 and the excess length absorption member 65 in the vehicle are routed in the vehicle body in a state in which the wires 11 are not covered by the conduit 12.

(Conduit 12)

Figure 16:
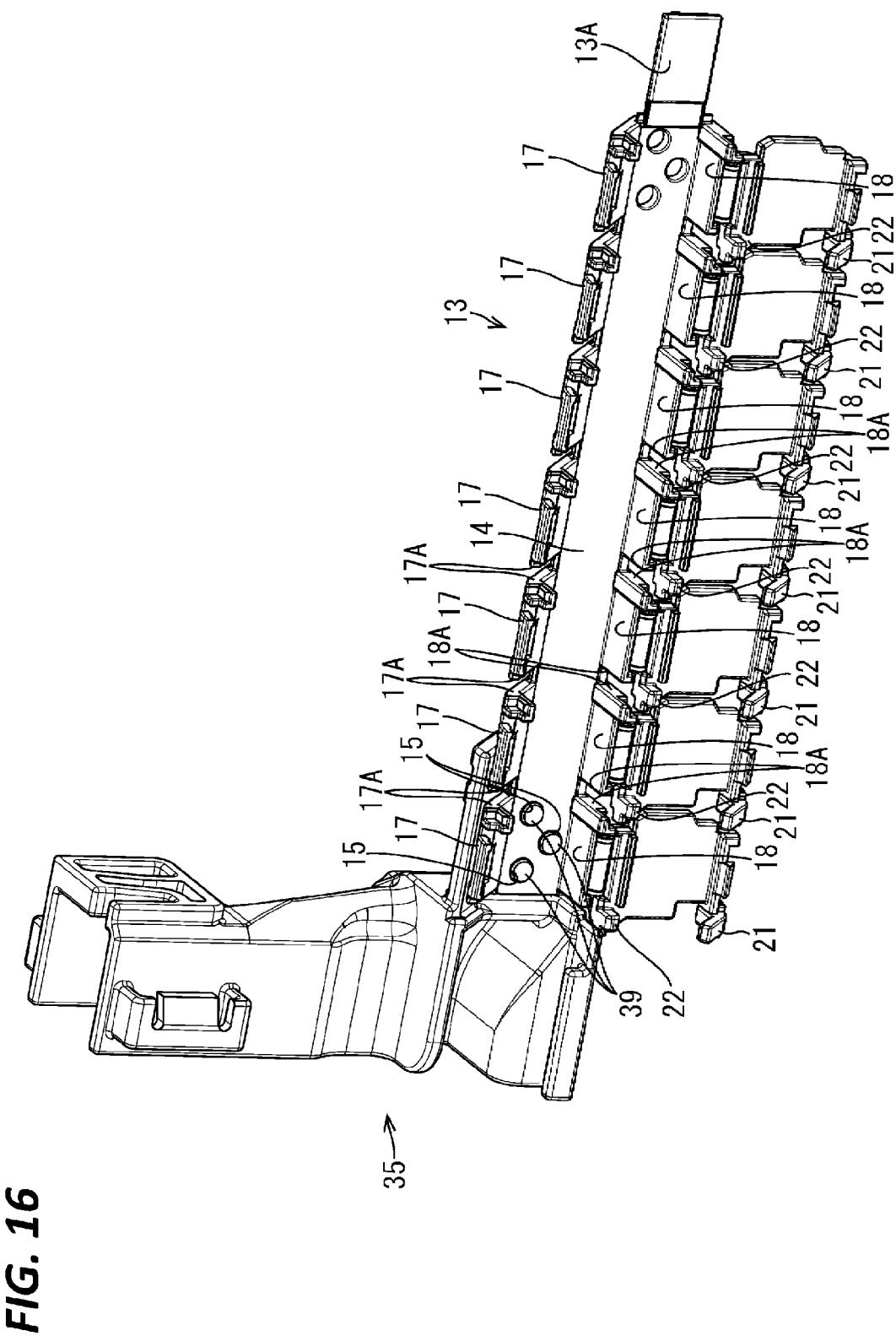
FIG. 16 is a perspective view showing a state in which the conduit is latched to latch portions of the first protector, coupling the conduit.

The conduit 12 has a polygonal tube shape and may be made from, for example, an insulating synthetic resin, and includes a conduit main body 13 that is shaped like the letter "U" in a cross-sectional view and extends in the front-rear direction, and a plurality (seven are shown in the drawings and the rest are omitted in the present embodiment) of lids 20 that are arranged and aligned such that they cover the open side of the conduit main body 13. As shown in FIG. 16, the conduit main body 13 includes a belt shaped portion 14 that extends in the shape of a belt and can bend, a plurality of upper wall portions 17 that are arranged and aligned on the edge portion of the upper side of the belt shaped portion 14, and a plurality of lower wall portions 18 that are provided and aligned on the edge portion of the lower side of the belt shaped portion 14.

At the rear end portion (one end portion) of the belt shaped portion 14, a plurality (three in the present embodiment) of latching holes 15 are formed passing therethough into which another conduit 12 or latch portions 39 of the protector 30 are latched, thus restricting movement of the conduit 12. The latching holes 15 are circular and are formed at positions corresponding to the latch portions 39 of the protector 30. At the front end portion (the other end portion) of the conduit main body 13, a joining part 13A extends, and a plurality (three in the present embodiment) of latching protrusion portions for joining to another conduit 12 protrude rightward.

The lower wall portions 18 extend in a direction that is orthogonal to the plate surface of the belt shaped portion 14, and the leading end portions of the lower wall portions 18 rotatably and pivotally support the lower end portions of the lids 20. The upper wall portions 17 are inclined relative to the plate surface of the belt shaped portion 14, and the leading end portions of the upper wall portions 17 can latch to and hold the lids 20 in a closed state. The lids 20 have a flat rectangular shape, and include first insertion portions 21 that are inserted into groove portions 17A between the adjacent upper wall portions 17 in the conduit main body 13 when the lids 20 are in the closed state, and second insertion portions 22 that are inserted into groove portions 18A between adjacent lower wall portions 18 in the conduit main body 13 when the lids 20 are in a closed state. The conduit 12 can only bend toward the belt shaped portion 14 side (the excess length absorption member 65 side) due to the first insertion portion 21 and the second insertion portion 22 being respectively inserted into groove portions 17A and 18B, and therefore bending toward the lids 20 of the conduit 12 is restricted.

Figure 14:
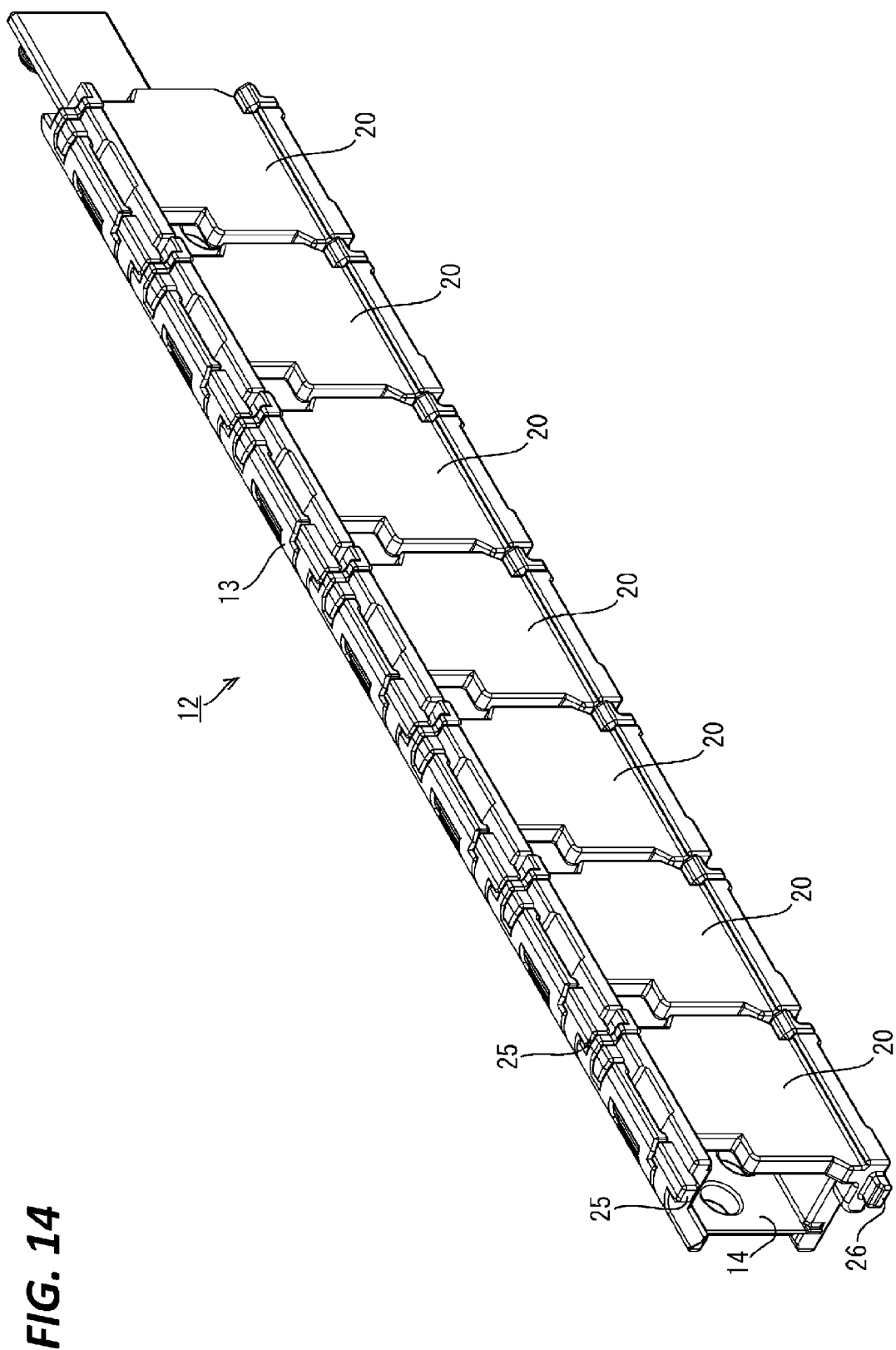
FIG. 14 is a perspective view showing a conduit.
Figure 15:
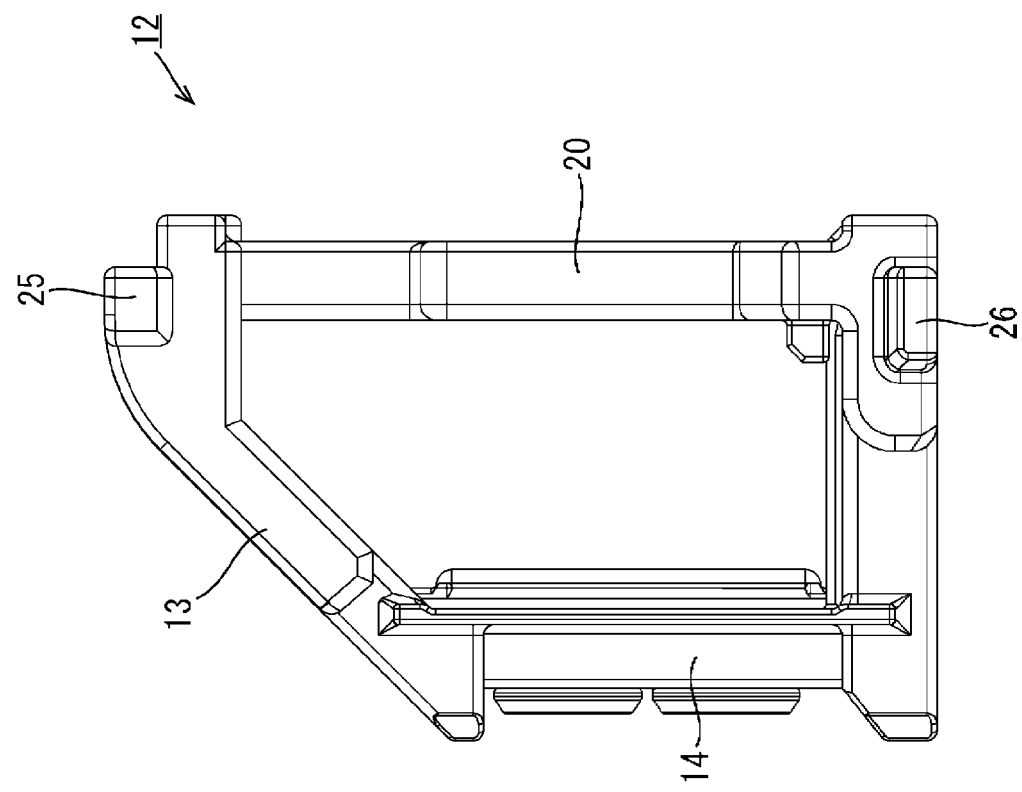
FIG. 15 is a rear view showing the conduit.

As shown in FIG. 14, the upper portion of the rear end portion (the end portion on the protector 30 side) of each lid 20 has a first protruding portion 25 that protrudes rearward, and the lower portion of the rear end portion of each lid 20 has a second protruding portion 26 that protrudes rearward. The first protruding portion 25 (of the lid 20) of the plurality of lined-up lids 20 that is on the rear end portion of the conduit 12 fits into a recessed portion 49 of the protector 30 (see FIG. 6).

(Protector 30)

Figure 6:
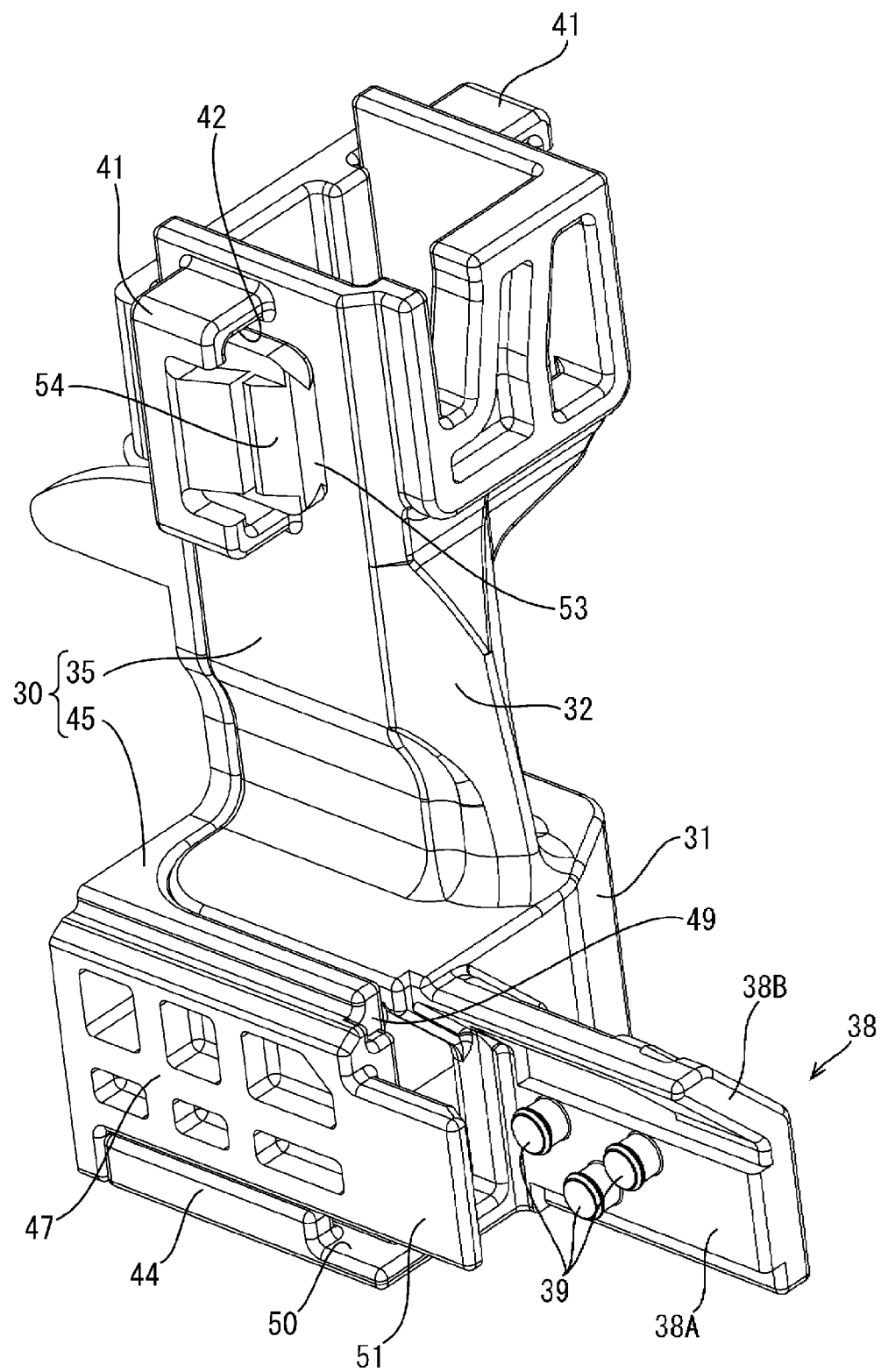
FIG. 6 is a perspective view showing the protector.
Figure 7:
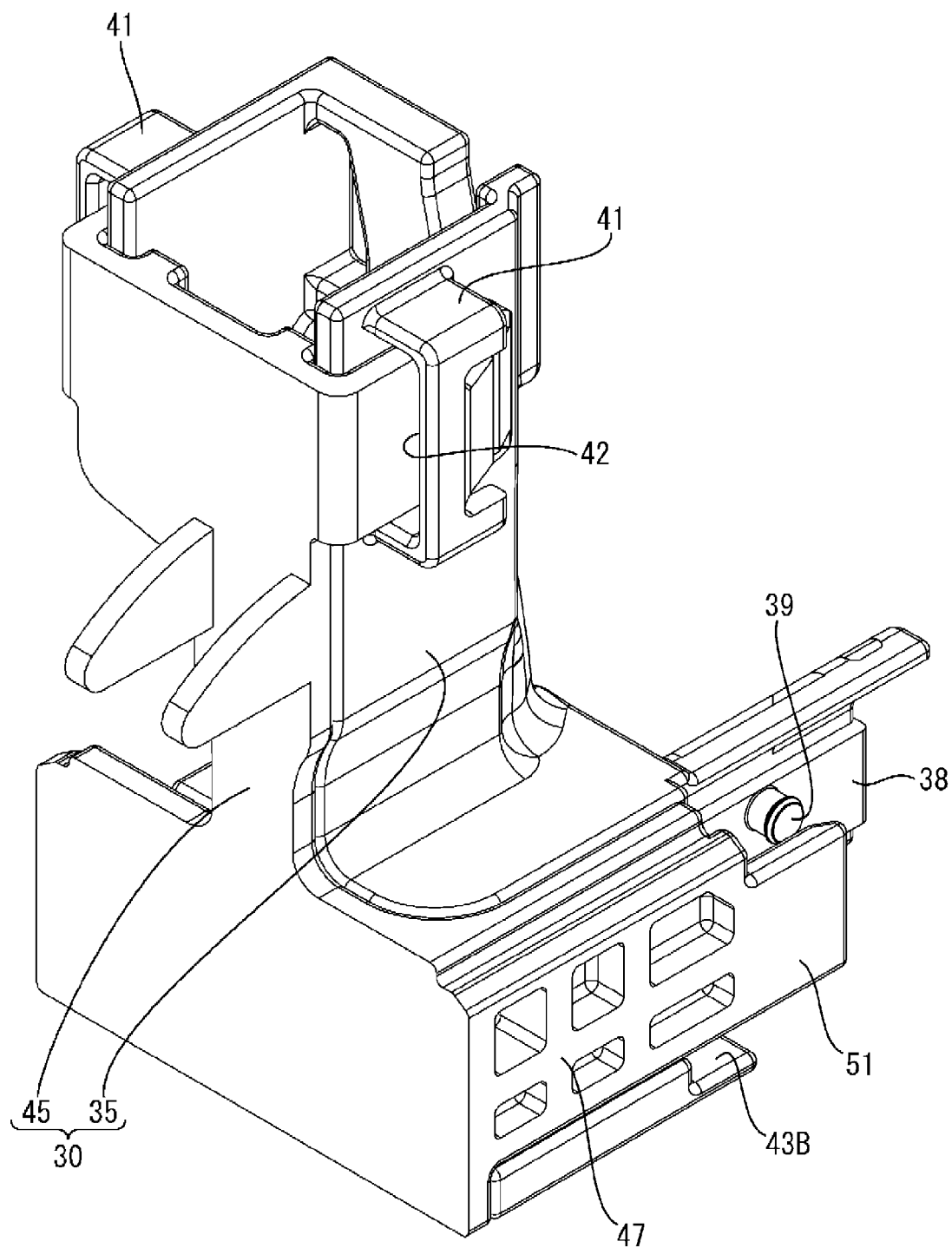
FIG. 7 is a perspective view showing the protector from a different direction than in FIG. 6.
Figure 8:
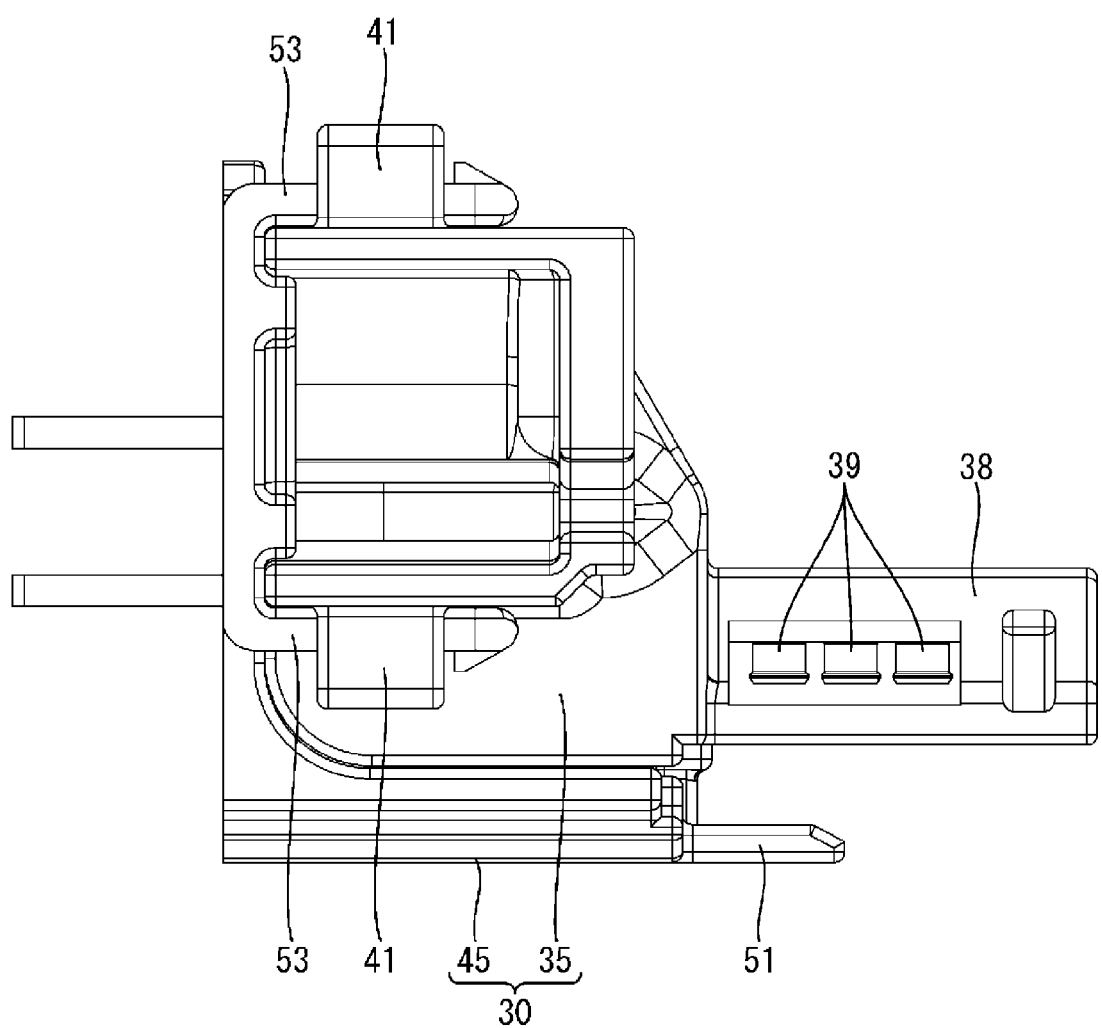
FIG. 8 is a plan view showing the protector.
Figure 9:
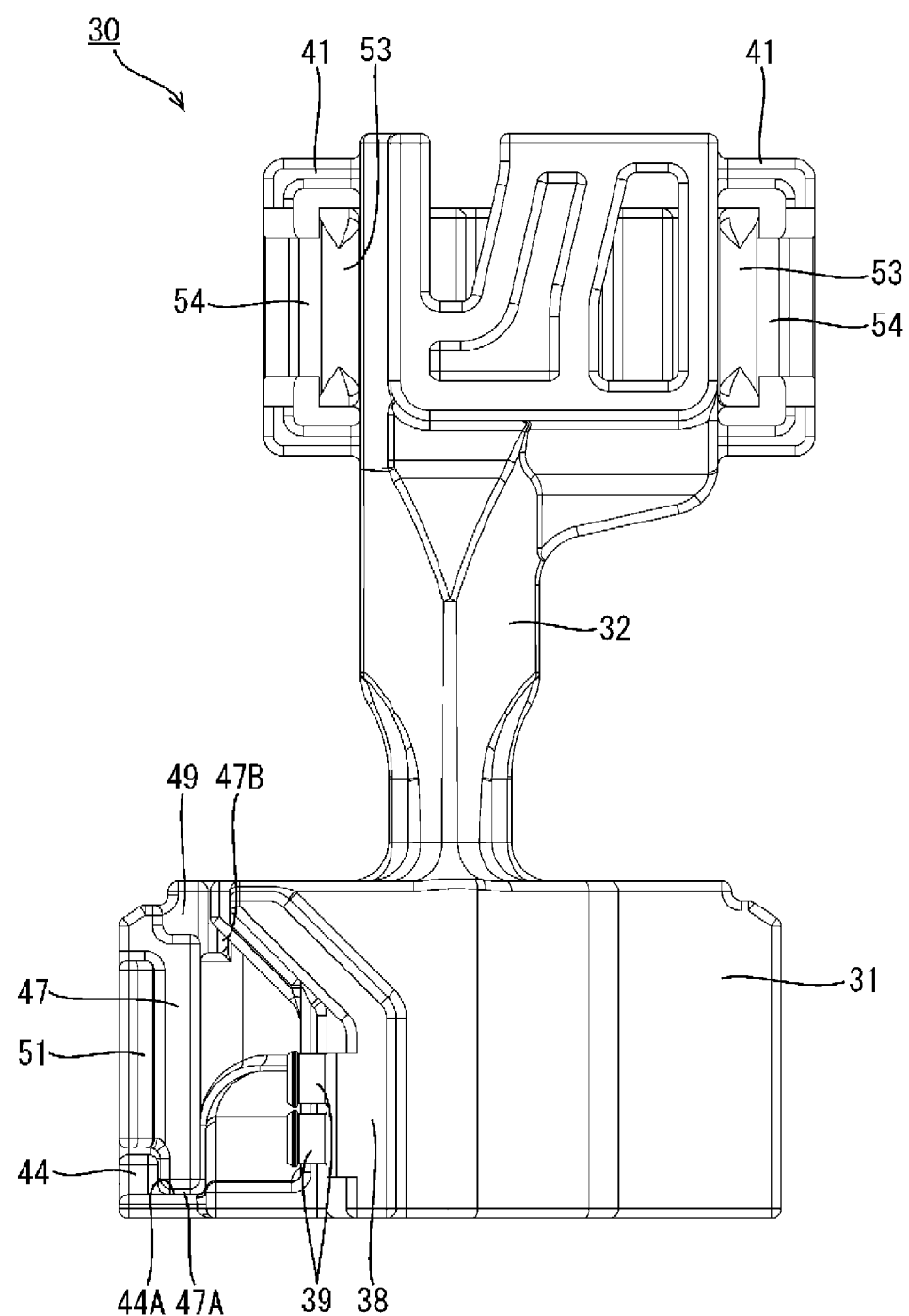
FIG. 9 is a front view showing the protector.

The protector 30 is made of a insulating synthetic resin and, as shown in FIG. 6, has a tubular shape that extends in the vertical direction and with which it is possible to guide the internal wires 11. The protector 30 includes a wire accommodating room 31 that is provided in the lower end portion of the protector 30 and ensures a space into which the wires 11 are arranged, and an upwardly-extending extending portion 32 whose diameter reduces stepwise from the wire accommodating room 31 upwards. The protector 30 includes a first protector 35 and a second protector 45 that fits into the first protector 35, and the wires 11 are inserted between the first protector 35 and the second protector 45.

Figure 10:
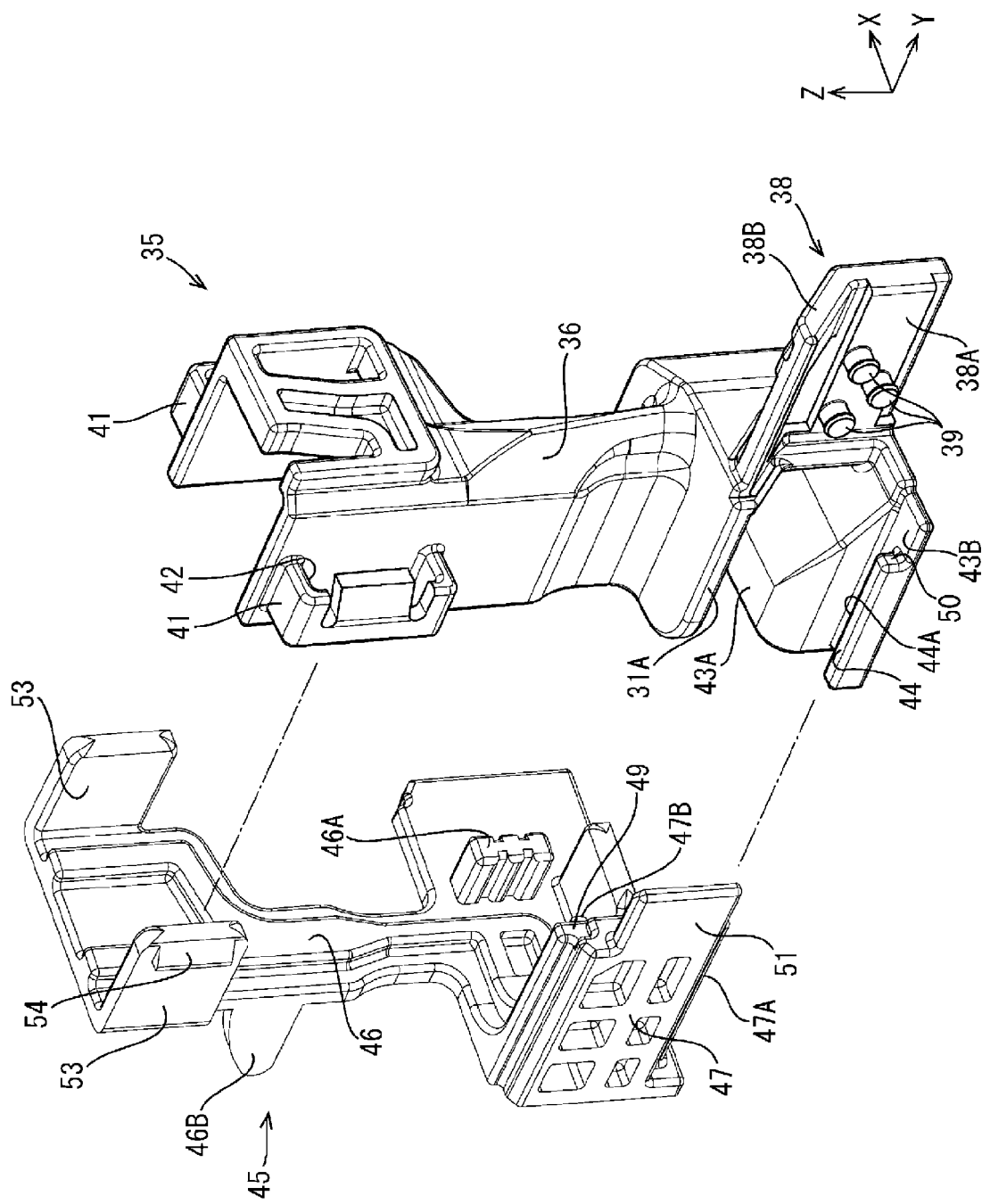
FIG. 10 is an exploded perspective view showing the protector.
Figure 11:
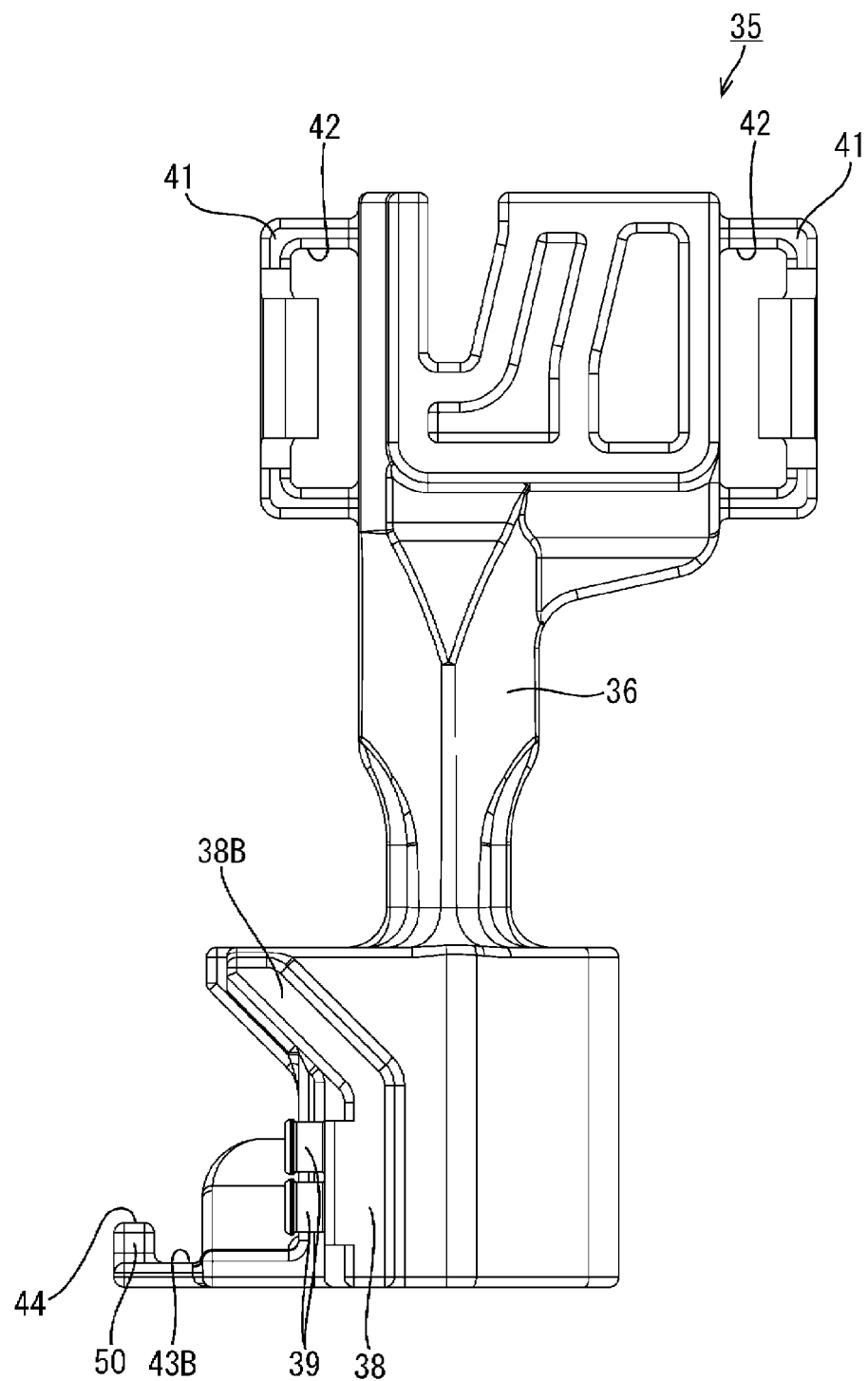
FIG. 11 is a front view showing a first protector.
Figure 12:
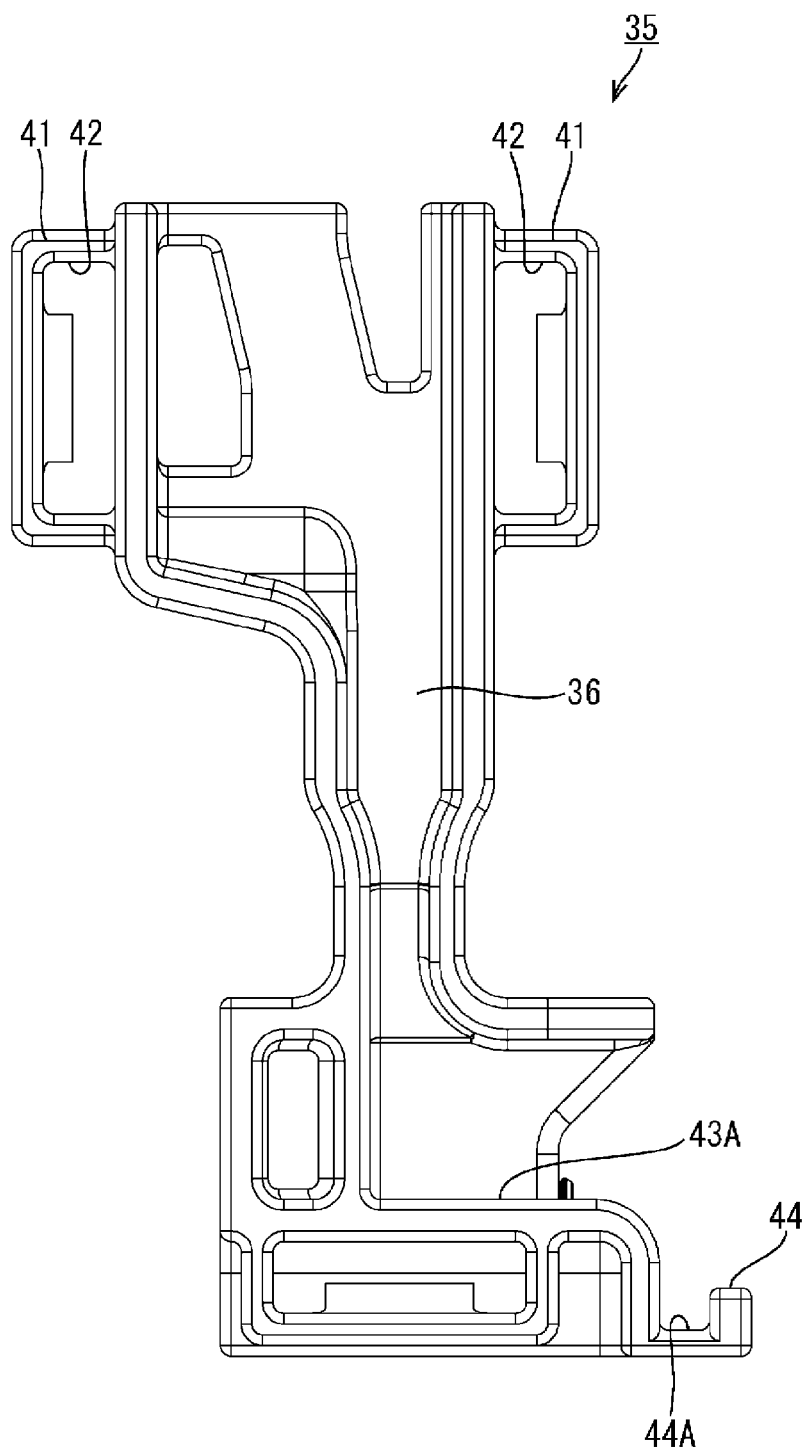
FIG. 12 is a rear view showing the first protector.
Figure 13:
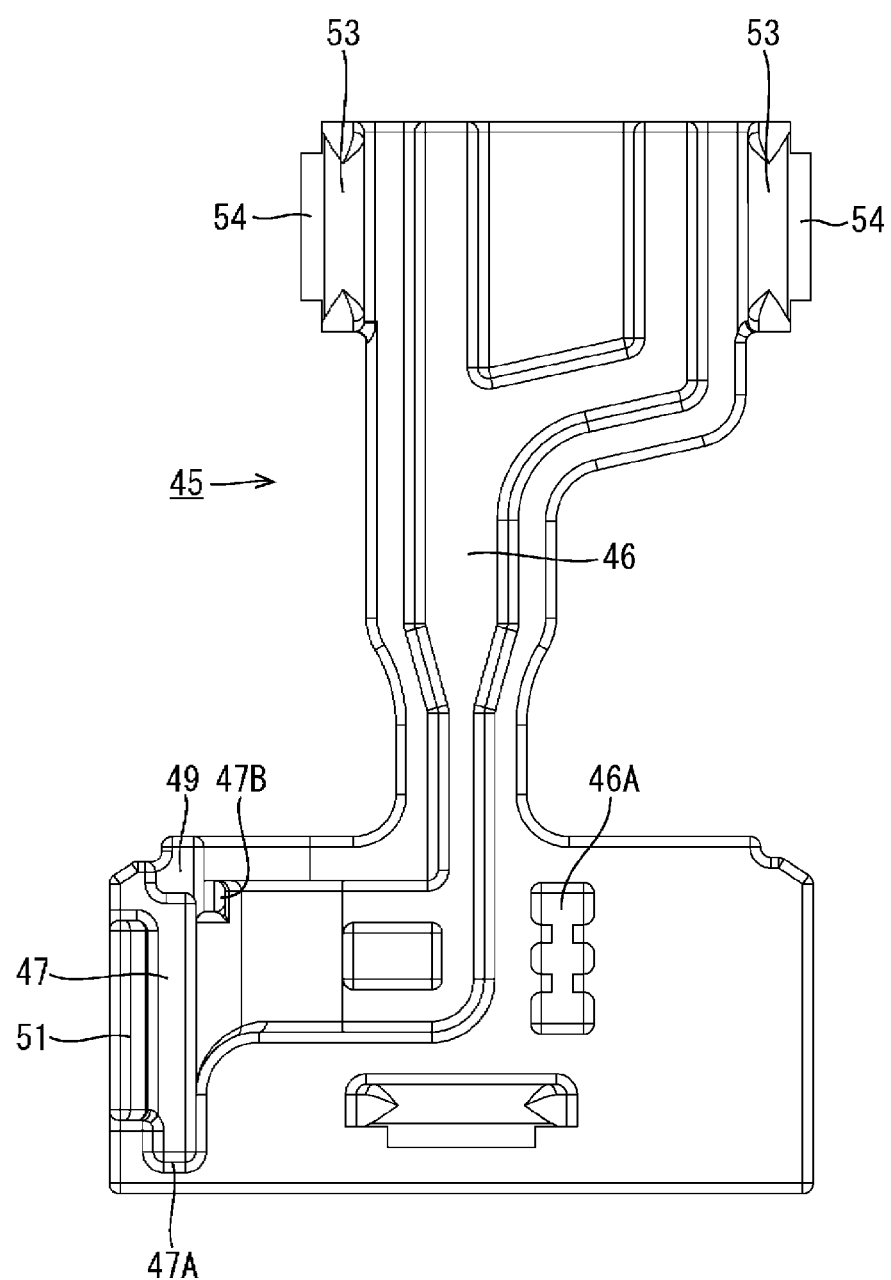
FIG. 13 is a front view showing a second protector.

As shown in FIG. 10, the first protector 35 includes a first body 36 that has a shape that is open on the rearward side and the leftward side of the lower portion thereof, an external fitting portion 38 that protrudes forward from the first body 36 and externally fits to a rear end portion of the conduit main body 13, and a pair of locked portions 41 that are provided on both side walls of the first body 36. The external fitting portion 38 has a shape that is bent to conform to the outer surface of the conduit main body 13 and includes a flat plate portion 38A that is parallel with a sliding portion 51 of the second protector 45, and a plank-shaped inclined portion 38B that is bent at an obtuse angle relative to the flat plate portion 38A.

A plurality (three in the present embodiment) of latch portions 39 protrude from the flat plate portion 38A toward the sliding portion 51. Each latch portion 39 has a cylindrical shape and is positioned such that the center of that latch portion 39 is at a vertex of an isosceles triangle. Each locked portion 41 is frame-shaped with a locking hole 42 formed passing therethrough, and includes a bent part that is latched to a locking protrusion 54. The portion of the first protector 35 that constitutes the wire accommodating room 31 is provided with a stand portion 43A that is the elevated bottom surface of the first protector 35, and is also provided with a bottom plate 43B that is lowered leftward of the stand portion 43A, and a ledge 44 that stands upright from the end side of the bottom plate 43B, with the inner side of ledge 44 forming the guide groove 44A. The front end portion of the ledge 44 is removed and forms a removed portion 50 where the bottom plate 43B is exposed.

The second protector 45 includes a second body 46 that is fitted to the rear side and the left side of the first body 36, a side wall portion 47 that extends forward and forms the side wall of the wire accommodating room 31, and a pair of locking portions 53 that protrude from both side edges of the upper portion of the second body 46 and are latched to the locked portions 41 in a locked state. The front surface of the second body 46 is provided with a guide wall 46A that protrudes forward and guides the wires 11. The back surface of the second body 46 has a pair of fixing plates 46B protruding therefrom for fixing to the front surface of the slider 66. The right surface of the upper portion of the side wall portion 47 has a protruding portion 47B that protrudes toward the first protector 35. The protruding portion 47B extends in the front-rear direction and abuts the bottom surface of an edge portion 31A of the upper wall of the wire accommodating room 31. A lower end portion 47A of the side wall portion 47 is inserted into a guide groove 44A of the first protector 35. When the second protector 45 is attached to the first protector 35, the protruding portion 47B and the side wall portion 47 are slid along the edge portion 31A and the guide groove 44A of the first protector 35, thus guiding the second protector 45 to the first protector 35. The lower end portion 47A of the side wall portion 47 is inserted into the guide groove 44A, therefore keeping the side wall portion 47 from falling outward. By keeping the side wall portion 47 from falling outward, it is possible to restrict bending between the protector 30 and the conduit 12 because the outward displacement of the sliding portion 51, which is formed as a single body with the side wall portion 47, is suppressed.

The sliding portion 51 extends forward from the front end portion of the side wall portion 47. The sliding portion 51 has a rectangular plank-shape and is smaller in the front-rear direction than the external fitting portion 38 and the lid 20. The front end portion of the upper portion of the side wall portion 47 is provided with the recessed portion 49 that fits onto the first protruding portion 25 of the conduit 12.

Each locking portion 53 has a locking protrusion 54 formed on the leading end member of the plate portion that extends in a plank-shape. The locking protrusion 54 protrudes stepwise towards the outside, and the protrusion becomes smaller in size diagonally towards the leading end side thereof. The locking portions 53 and the sliding portion 51 extend forward and parallel to each other.

The following is a description of the steps of assembling the wire harness 10.

Figure 17:
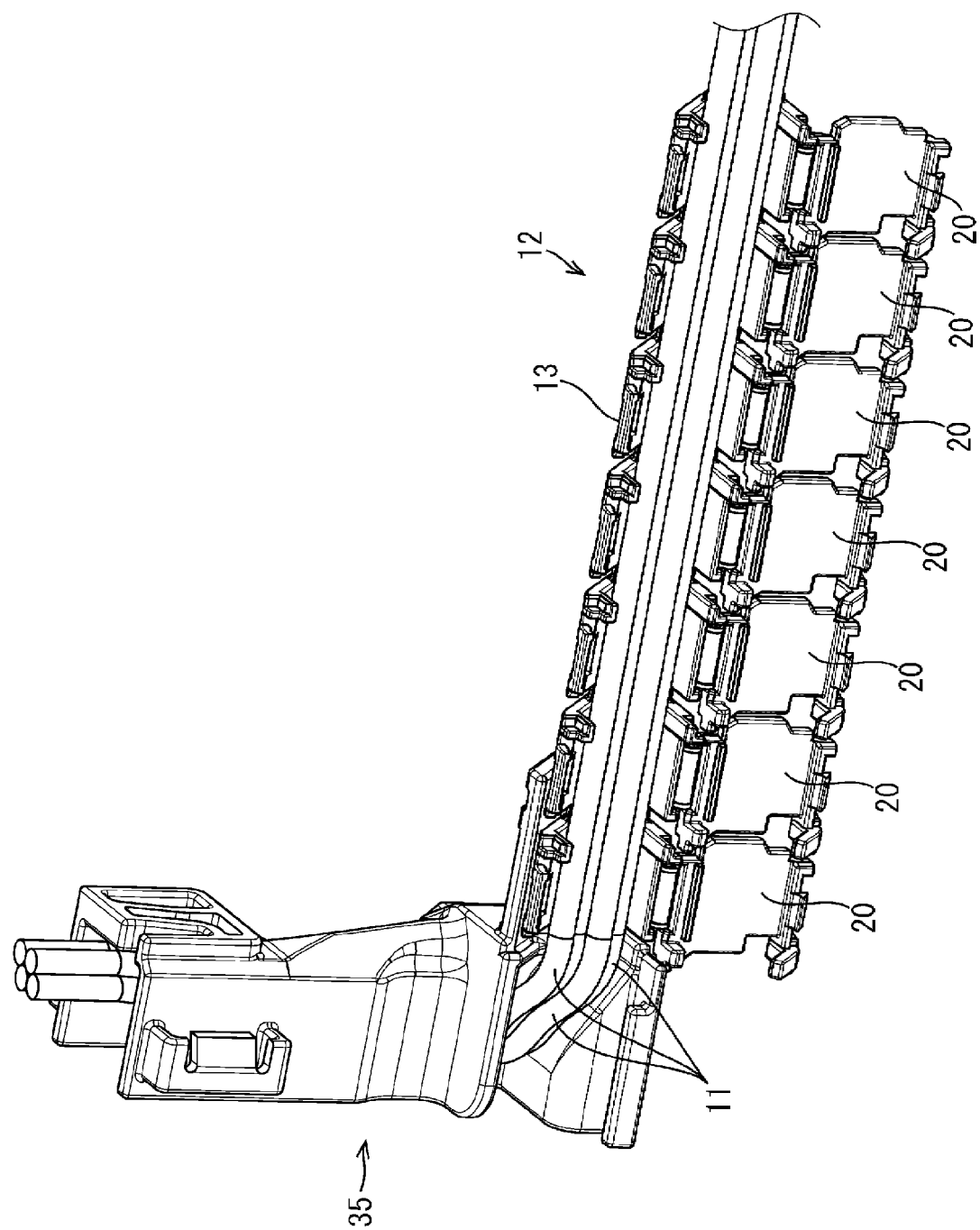
FIG. 17 is a perspective view showing the state in FIG. 16 in which a plurality of wires have been mounted.
Figure 18:
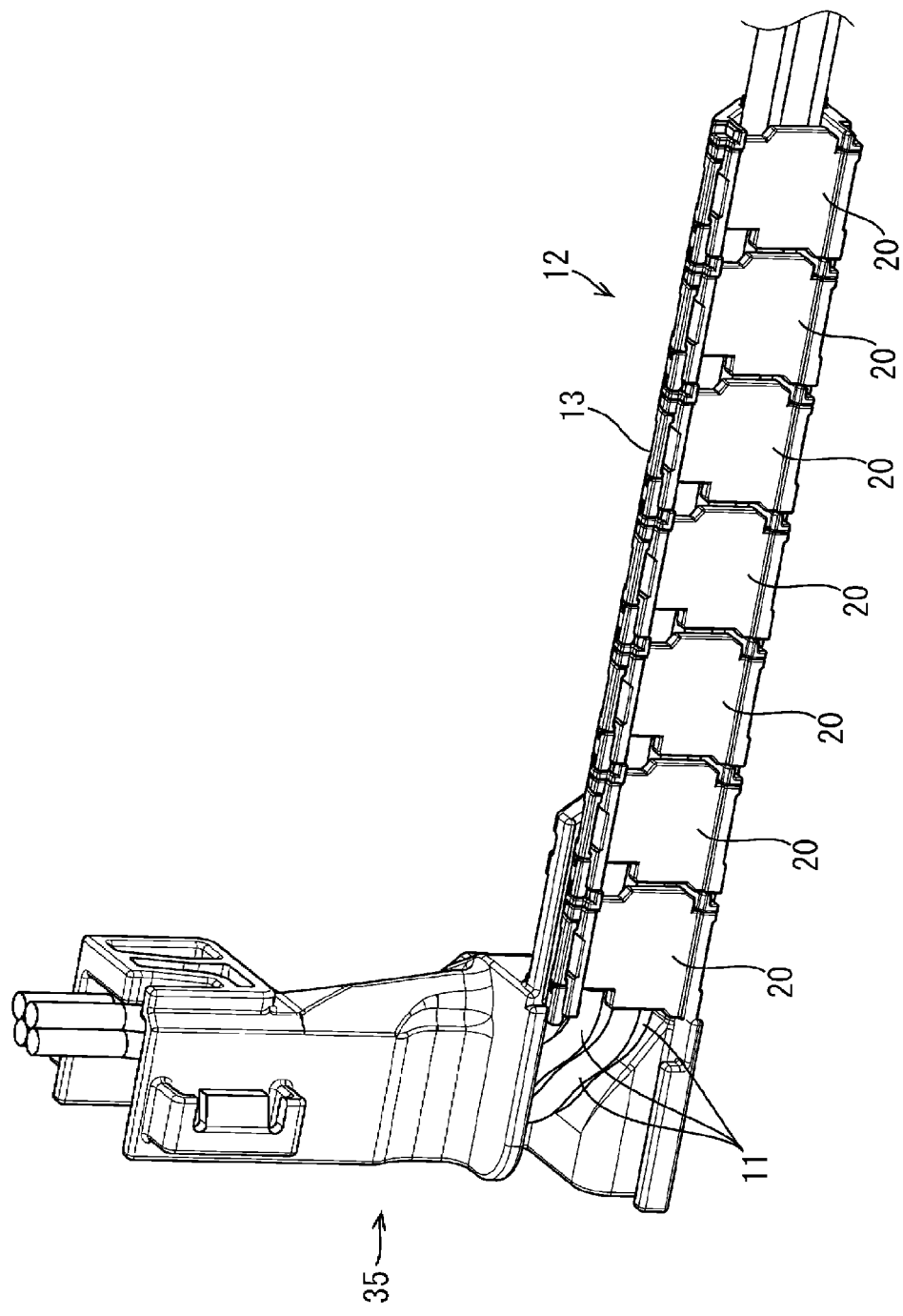
FIG. 18 is a perspective view showing the state in FIG. 17 which a plurality of lid portions have been closed.
Figure 19:
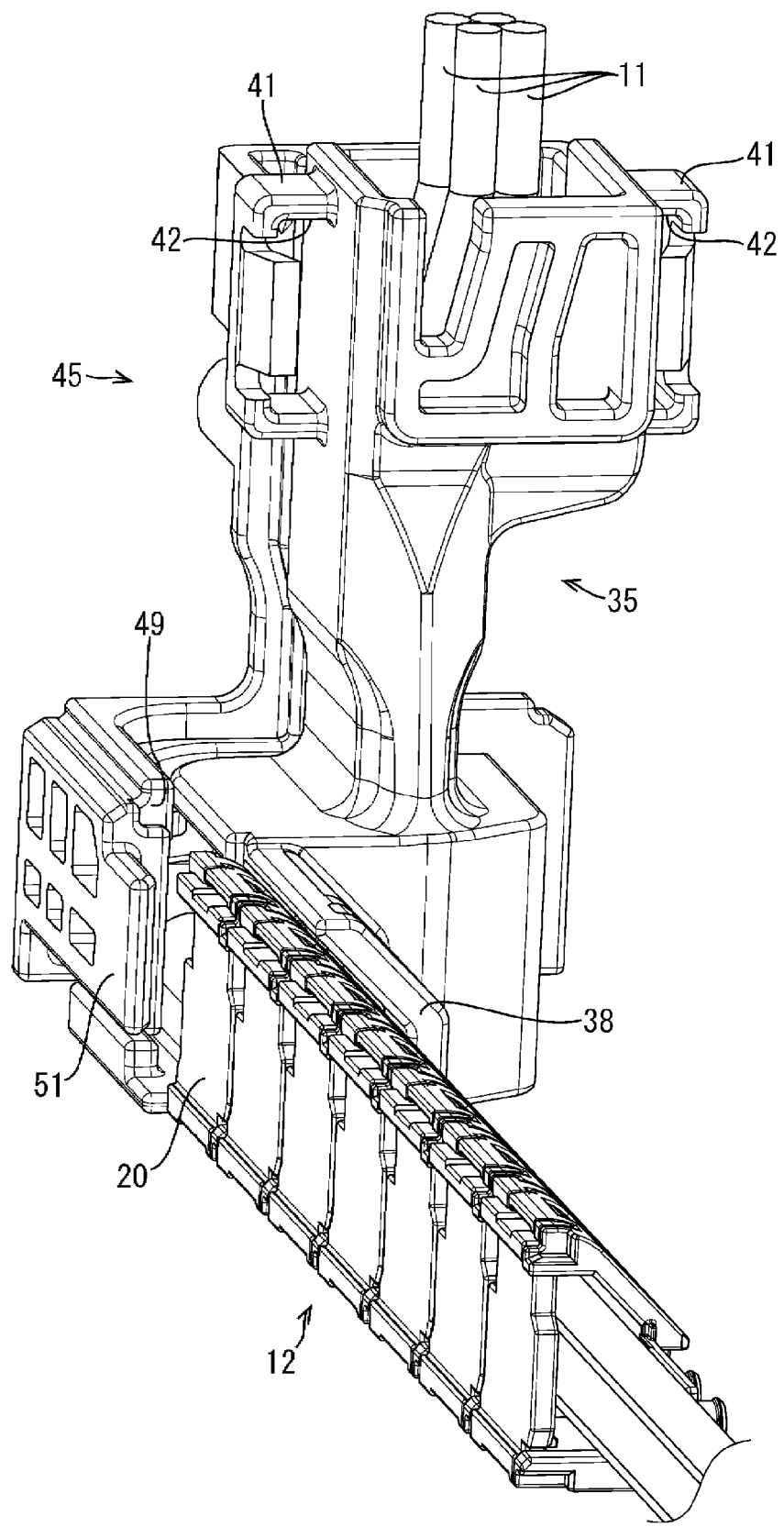
FIG. 19 is a perspective view showing the process of attaching a second protector to a first protector.

As shown in FIG. 16, the plurality of lids 20 are attached to the conduit main body 13, forming the conduit 12 with the lids 20 in the open state, and the latch portions 39 of the first protector 35 are pressed into the latching holes 15 of the conduit 12 and the conduit 12 is thus fixed to the first protector 35. Next, as shown in FIG. 17, the plurality of wires 11 are inserted into the first protector 35 and the conduit main body 13, and the plurality of lids 20 are closed (see FIG. 18).

Next, as shown in FIG. 20, the second protector 45 is slid forward from the rear side of the first protector 35, the locking portions 53 are inserted into the locking holes 42, and the sliding portion 51 slides along the outer surface of the lid 20 of the rear end portion of the conduit 12. Thus, the locking protrusions 54 of the locking portions 53 pass through the locking holes 42, and the locking portions 53 reach their normal position (see FIGS. 3 and 4) of being latched to the locked portions 41 in a locked state. In this normal position, the vertical direction of the second protector 45 is positioned with respect to its vertical direction relative to the first protector 35 by the edge portion 31A and the guide groove 44A of the first protector 35 as well as the protruding portion 47B and the side wall portion 47 of the second protector 45. Also, the conduit 12 is sandwiched between the external fitting portion 38 and the sliding portion 51, and therefore the conduit 12 is positionally fixed in the left-right direction relative to the protector 30. The conduit 12 is fixed in the left-right direction, that is, fixed in the direction in which the latch portions 39 are pressed into the latching holes 15, and therefore it is possible to reliably fix the conduit 12 to the protector 30.

The following actions and effects are attained with the present embodiment.

A connection structure connecting the conduit 12 to the protector 30, the conduit 12 having the wire 11 inserted therein and being configured to move in accordance with sliding of the seat 60 (sliding object), and the protector 30 being attached to an end portion of the conduit 12 and being configured to move with the conduit 12, wherein the protector 30 includes: the latch portion 39 that is joined to the conduit 12 in a latched state; and the sliding portion 51 that can slide in the direction in which the conduit 12 extends, opposes the conduit 12 in a normal position, and restricts release of the latched state of the latch portion 39.

With this embodiment, the sliding portion 51 is slid in the direction in which the conduit 12 extends and moves to a normal position, and it is therefore possible for the protector 30 to be easily and reliably connected to an end portion of the conduit 12 even if, for example, the conduit 12 is not bellows-shaped. Also, it is possible to join the protector 30 to the conduit 12 in a locked state and slide the sliding portion 51, thus improving workability of attachment.

Also, the first protector 35 includes the latch portion 39 and the locked portion 41 and the second protector 45 includes the sliding portion 51 and the locked portion 41 that is configured to move in the direction in which the sliding portion 51 slides and locks to the locking portion 53, wherein the wire 11 is inserted between the first protector 35 and the second protector 45.

With this configuration, the second protector 45 slides into the first protector 35 in the direction in which the conduit 12 extends, thus making it possible to simultaneously move the sliding portion 51 to the normal position and lock the locking portions 53 to the locked portions 41, thus making it possible to improve workability of attachment.

Also, the conduit 12 has a polygonal tube shape and includes a flat outer surface, and the sliding portion 51 has a flat plank-shape and opposes the flat outer surface of the conduit 12.

With this configuration, it is possible to face the sliding portion 51 toward the outer surface of the conduit 12 with a simple configuration.

Also, the protector 30 is fixed to the slider 66 that is slidably arranged in the rail 62 that is fixed to a vehicle.

With this configuration, it is possible to slide the position of the protector 30 in a stable state.

Other Embodiments

The technique disclosed in the present specification is not limited to the above embodiments described with reference to the drawings, and, for example, the following embodiments are also included within the technical scope of the technique disclosed in the present specification.

(1) The latch portions 39 of the protector 30 are configured to be pressed into and latched to the latching holes 15 of the conduit 12, but there is no limitation thereto. For example, a configuration is also possible in which the latch portions 39 are not pressed into the latching holes 15 and gaps are formed between the latch portions 39 and the latching holes 15. For example, a configuration is also possible in which the conduit 12 is provided with latching protrusions and is latched by the latching protrusions being pressed or the like into the latching holes of the protector 30. Also, fitting is not limited to that by way of protrusions and recesses, and a configuration is also possible in which, for example, one of the protector and the conduit has a hook portion that is latched to a groove portion in the other one of the protector and the conduit.

(2) The number of the wires 11 that constitute the wire harness 10 is not limited to the number of wires described in the foregoing embodiments, and can be changed to any number. Also, the conduit 12 that protects the wires 11 is not limited to the foregoing embodiments, and can be changed in various ways.

(3) The wire harness 10 is configured to move in accordance with the movement of the seat 60 as the sliding object, but there is not limitation thereto. For example, a configuration is also possible in which the wire harness moves in accordance with the movement of a sliding door of a vehicle as the sliding object.

(4) The wire harness 10 is configured to be sandwiched from the outer surface side of the conduit 12 by the external fitting portion 38 of the protector 30 and the sliding portion 51, but there is no limitation thereto. For example, a configuration is also possible in which a latch portion and the sliding portion are inserted into the conduit 12, latched by the latch portion from the inner surface side of the conduit 12, and thus the sliding portion 51 opposes the inner surface of the conduit and therefore the conduit 12 and the protector are connected in a state in which release of the latched state of the latch portion is restricted.

LIST OF REFERENCE NUMERALS

10: Wire harness
11: Wire
12: Conduit
20: Lid
30: Protector
35: First protector
39: Latch portion
41: Locked portion
45: Second protector
51: Sliding portion
53: Locking portion
60: Seat (sliding object)
62: Rail
66: Slider

The invention claimed is:

1. A connection structure connecting a conduit to a protector, the conduit having a wire inserted therein and being configured to move in accordance with sliding of a sliding object, and the protector being attached to an end portion of the conduit and being configured to move with the conduit, wherein, the protector includes:

a first protector that includes a latch portion that is joined to the conduit in a latched state and a locked portion; and a second protector that includes a sliding portion that can slide in the direction in which the conduit extends, opposes the conduit in a normal position, and restricts release of the latched state of the latch portion, and a locking portion that is configured to move in the direction in which the sliding portion slides and locks to the locked portion, and wherein the wire is inserted between the first protector and the second protector.

2. The connection structure connecting a conduit and a protector according to claim 1, wherein the conduit has a polygonal tube shape and includes a flat outer surface, and the sliding portion has a flat plank-shape and opposes the flat outer surface of the conduit.

3. The connection structure connecting a conduit and a protector according to claim 1, wherein
the protector is fixed to a slider that is slidably arranged in a rail that is fixed to a vehicle.

4. A wire harness comprising:
a wire that is configured to move in accordance with sliding of a sliding object;
a conduit that has the wire inserted therein and is configured to move with the wire; and
a protector that is attached to an end portion of the conduit, moves with the conduit and has the wire inserted therein, wherein
the protector includes:
a first protector that includes a latch portion that is joined to the conduit in a latched state and a locked portion; and
a second protector that includes a sliding portion that can slide in the direction in which the conduit extends, opposes the conduit in a normal position, and restricts release of the latched state and a locking portion that is configured to move in the direction in which the sliding portion slides and locks to the locked portion, and
wherein the wire is inserted between the first protector and the second protector.

* * * * *